(12) United States Patent
Keeton et al.

(10) Patent No.: US 8,458,710 B2
(45) Date of Patent: Jun. 4, 2013

(54) SCHEDULING JOBS FOR EXECUTION ON A COMPUTER SYSTEM

(75) Inventors: Kimberly Keeton, San Francisco, CA (US); Manish Gupta, Karnataka (IN)

(73) Assignee: Hewlett-Packard Development Company, L. P., Houston, TX (US)

(*) Notice: Subject to any disclaimer, the term of this patent is extended or adjusted under 35 U.S.C. 154(b) by 660 days.

(21) Appl. No.: 12/553,643

(22) Filed: Sep. 3, 2009

(65) Prior Publication Data

US 2011/0055843 A1  Mar. 3, 2011

(51) Int. Cl.
*G06F 9/46* (2006.01)

(52) U.S. Cl.
USPC .................. 718/102; 718/104; 718/107

(58) Field of Classification Search
USPC ........................................... 718/102
See application file for complete search history.

(56) References Cited

U.S. PATENT DOCUMENTS

| 4,931,944 | A  | * | 6/1990  | Richter et al. ............... 700/100 |
| 5,392,430 | A  | * | 2/1995  | Chen et al. .................. 718/102 |
| 5,890,134 | A  | * | 3/1999  | Fox .............................. 705/7.24 |
| 6,272,483 | B1 | * | 8/2001  | Joslin et al. ................... 706/62 |
| 7,093,255 | B1 | * | 8/2006  | Hill .............................. 718/102 |
| 7,895,071 | B2 | * | 2/2011  | Khosla et al. ................ 705/7.13 |
| 2002/0178036 | A1 | * | 11/2002 | Murata et al. .................... 705/7 |
| 2004/0216002 | A1 | * | 10/2004 | Fromherz et al. ............... 714/25 |
| 2005/0216324 | A1 | * | 9/2005  | Maithell et al. ................. 705/8 |
| 2006/0041459 | A1 | * | 2/2006  | Hester et al. .................... 705/8 |
| 2006/0095311 | A1 | * | 5/2006  | Thompson ....................... 705/9 |
| 2011/0016214 | A1 | * | 1/2011  | Jackson ........................ 709/226 |

* cited by examiner

*Primary Examiner* — Jennifer To

(57) ABSTRACT

A technique includes determining an order for projects to be performed on a computer system. Each project is associated with multiple job sets, such that any of the job sets may be executed on the computer system to perform the project. The technique includes selecting the projects in a sequence according to the determined order to progressively build a schedule of jobs for execution on the computer system. For each selected project, incorporating one of the associated job sets into the schedule based on a cost of each of the associated job sets.

13 Claims, 5 Drawing Sheets

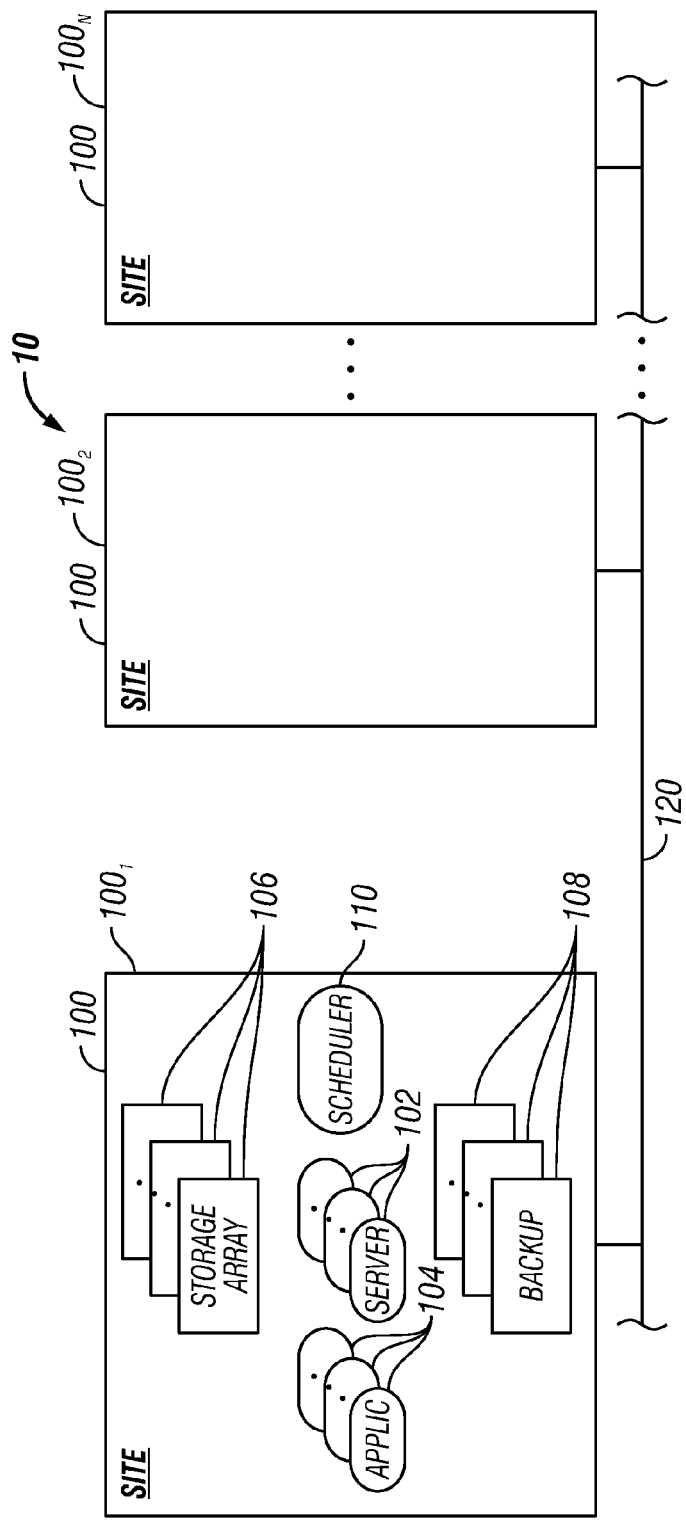
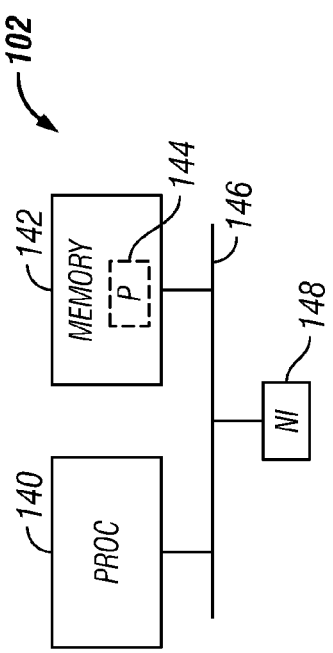
FIG. 1
FIG. 2

SCHEDULING JOBS FOR EXECUTION ON A COMPUTER SYSTEM

BACKGROUND

The invention generally relates to scheduling jobs for execution on a computer system.

Jobs may be scheduled for execution on a computer system for purposes of performing a particular operation. There may be alternative ways to perform the operation, each comprised of a set of jobs, and as such, there are many possible ways that jobs may be selected and scheduled to perform the operation. The selection and scheduling of the jobs typically are constrained by the resources of the computer system, and as such, the scheduling dilemma may be referred to as "multi-alternative resource constrained project scheduling."

As an example, multi-alternative resource constrained project scheduling may arise in connection with scheduling jobs for a data recovery operation. More specifically, application workloads of a computer system may be subject to a permanent or temporary data outage due to an array failure or site failure. When such a failure occurs, jobs typically are scheduled on the computer system for purposes of recovering the datasets for these workloads. Due to the relatively limited and shared resources of the system, all of the data recovery jobs typically cannot proceed concurrently, but rather, the data recovery jobs typically are scheduled according to the priorities of the workloads. Furthermore, the different options that are available for recovering a particular dataset may also be taken into account. For example, one option for recovering a dataset may involve failing over to a replica dataset at a remote site, and another recovery option may involve reconstructing the dataset from a local backup. Poor scheduling decisions for the recovery process may result in relatively significant costs and productivity losses.

BRIEF DESCRIPTION OF THE DRAWING

FIG. 1 is a schematic diagram of a computer system according to an embodiment of the invention.

FIG. 2 is a schematic diagram of a server of the system of FIG. 1 according to an embodiment of the invention.

DETAILED DESCRIPTION

Figure 3:
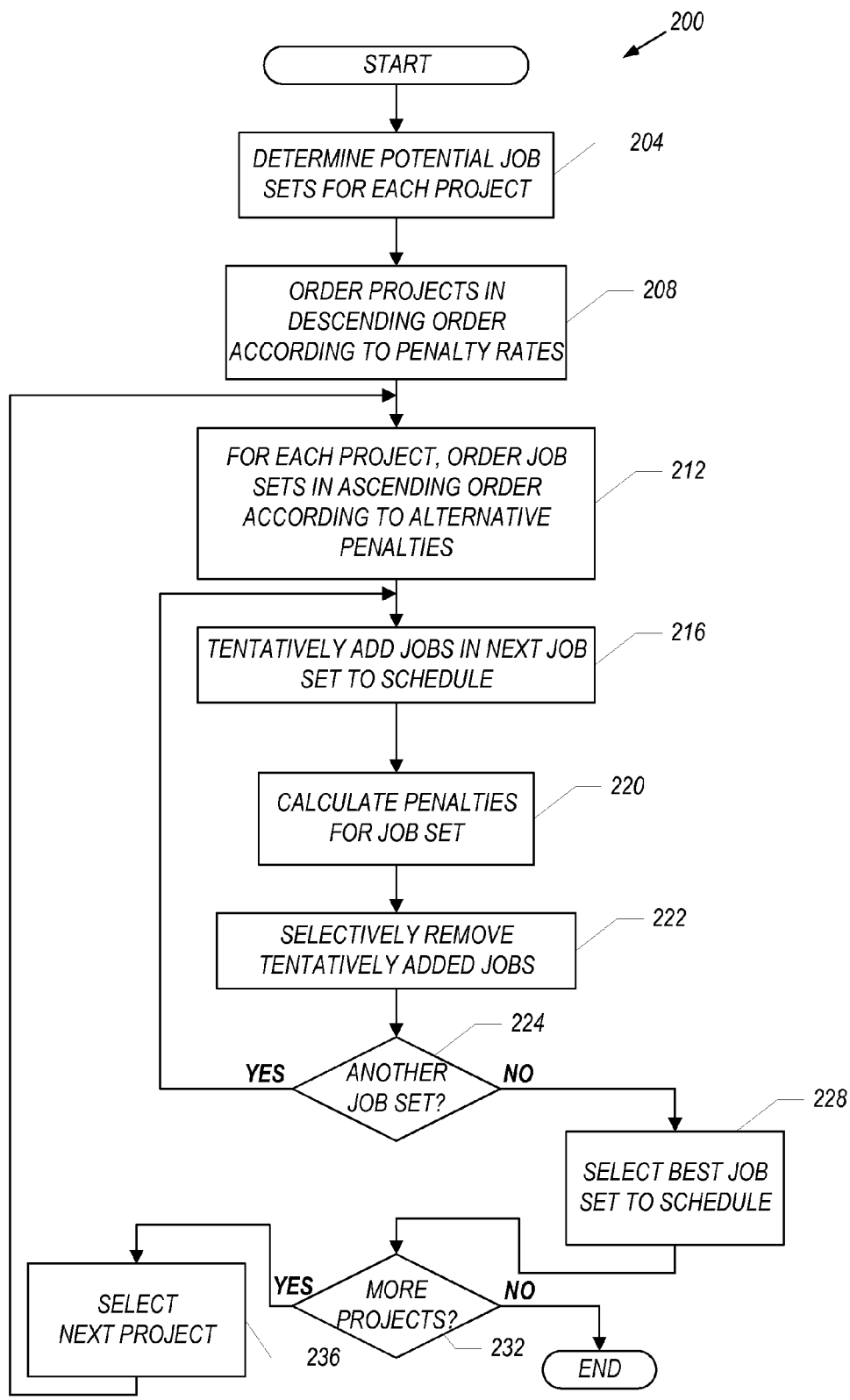
FIGS. 3 and 5 are flow diagrams depicting techniques to generate job schedules according to embodiments of the invention.

Techniques and systems are described herein to address the multi-alternative resource constrained project scheduling dilemma, regardless of the context in which it arises. More specifically, as described below, the scheduling process determines an optimal or near optimal schedule for the jobs, which has relatively low costs, relatively low productivity losses and takes the system's finite resources into account. The "schedule" is essentially a schedule of "projects," and the computer system performs each project by executing a particular job set. Several options are available for performing each project, as a given project may be accomplished by one of multiple potential job sets. The jobs within each job set have precedence constraints and resource requirements, as the jobs use non-exclusive subsets of the same set of system resources (memories, bus bandwidth, storage, processing bandwidths, etc.) of the computer system.

Different projects may compete for resources, and the overlap between the resources required for two projects may be partial or complete. In accordance with embodiments of the invention described herein, costs are associated with the projects. As an example, the particular costs may be a function of the particular job set (alternative penalties), the delay before a particular job begins, or the time it takes to complete a particular job once it starts. Given these costs, the goal is to find a scheduling solution that substantially minimizes the total costs that are incurred by all of the projects. The solution takes into account the jobs' resource requirements, the choice of job set alternatives for each project and the schedule of jobs across all of the projects, which obeys the precedence constraints and does not exceed the capabilities of the resources.

A data recovery operation is just one example of operations that fall within the realm of multi-alternative resource-constrained project scheduling. When a data site or array failure occurs in a computer system, there may be many possible alternative ways to recover the temporarily lost data. However, recovering the data is constrained by the available resources of the system. More specifically, the data recovery may need to be scheduled in an environment where application workloads with different priorities have different alternatives for recovering their datasets. As an example, these alternatives may include a failover to a remote replica after a site disaster and/or reconstruction from a local backup after an array failure when multiple workloads share the resources.

The goal of scheduling jobs in the data recovery operation is to determine what copy of data should be used to recover each workload after a failure; how recovery jobs should be balanced with each other and with the continued execution of workloads unaffected by the failure; and how device resources should be allocated. Applications incur penalties for downtime, the loss of recently updated data, and vulnerability to subsequent failures during recovery. A goal of the scheduling problem is to find the schedule that minimizes the overall penalties incurred.

Multi-alternative resource constrained project scheduling has applications outside of data recovery. For example, multi-alternative resource constrained project scheduling also arises in information management applications, such as extracting structured metadata from unstructured documents. The goal is to perform multiple analyses to capture metadata describing each newly created or modified file, including file type, creation/modification time, owner, content hash, and a vector of keywords contained in the file. Some analyses (e.g., file type determination) may need to happen before others can begin (e.g., keyword extraction for text files). Files may be replicated across different machines in an organization (e.g., servers, desktops and laptops), and these different machines may have different computational capabilities and idleness. Unique content is analyzed once, so the replicas provide multiple alternatives for completing this analysis. The goal is to complete the analysis within a certain delay after the content is created, and penalties may be incurred if background analysis work interferes with the foreground activity on a machine. Penalties may also be incurred if the analysis is not completed within a specified delay.

As another example, multi-alternative resource constrained project scheduling issues also arise in scheduling the different phases of map-reduce computations in a cloud computing environment with multiple data replicas.

As can be appreciated by one of skill in the art, multi-alternative resource constrained project scheduling arises in areas other than those that are specifically described herein.

Referring to FIG. 1, for purposes of example, the scheduling of jobs for a particular operation may be performed by a scheduler 110 of an exemplary computer system 10. The computer system 10 may include various computer system sites 100 (sites $100_1$, $100_2$, ... $100_N$, being depicted in FIG. 1 as examples) that are linked together by a communication network 120. As examples, the communication network 120 may be a local area network (LAN), a wide area network (WAN), an Internet-based network, etc. In general, each site 100 may include servers 102.

In accordance with embodiments of the invention that are depicted herein, the scheduler 110 is a software application that is executed by one or more servers 102 at the site $100_1$ (for purposes of example), although the scheduler 110 may be on other sites 100 as well as on another computer not depicted in FIG. 1, depending on the particular embodiment of the invention.

Referring to FIG. 2, in accordance with some embodiments of the invention, the scheduler 110 (FIG. 1) may be formed by the execution of program instructions 144 on one or more processors 140 (CPU cores, CPU packages, etc.). In this regard, the processors 140 and a memory 142 that stores the program instructions 144 may be part of one of the servers 102 (as shown in FIG. 2), although the scheduler 110 may be embodied in one of the other sites or on a separate computer, depending on the particular embodiment of the invention. As shown in FIG. 2, for this particular embodiment of the invention, the server 102 may also include various other hardware, such as a network interface (NI) 148 that communicates with the network 120 and an internal bus architecture 146.

The scheduler 110 begins the scheduling process for a particular operation by initially arranging the projects to be accomplished in the operation in a sequence, or order, in which the projects will be processed by the scheduler 110. In accordance with this order, the scheduler 110 progressively builds the schedule. In this manner, the scheduler 110 selects the next project (in accordance with the order); selects the particular job set for each project, which minimizes the cost among all of the potential job sets for the project; incorporates the jobs for the particular job set into the schedule; and then selects the next project and repeats other iteration(s) until the schedule is generated.

In accordance with embodiments of the invention, the scheduler 110 applies a "greedy" scheduling heuristic to initially order the projects in a descending priority order, according to the associated start time penalties of the projects. This is due to the fact that scheduling decisions impact the start times of the jobs. However, it is noted that in accordance with other embodiments of the invention, the scheduler 110 may use other criteria for purposes of ordering the projects. For the start time criteria, this ordering allows the scheduler 110 to give preferential treatment to projects that are the most adversely impacted by relatively bad scheduling decisions. Using this initial ordering, the scheduler 110 selects the appropriate job set for each project by simulating the operation of each of the alternative job sets and selecting the job set that minimizes the total costs.

More specifically, during the simulation of each alternative job set, the scheduler 110 incorporates the jobs of each job set into the schedule using an elastic allocation of resources. For each required resource, this elastic approach allocates all available resources for each job (i.e., up to the maximum amount of resources that the job can consume), and hence, the project completes faster than if the job would otherwise share the required resources with other, less important jobs.

More specifically, the projects that are described herein may each be performed using one of multiple alternative job sets, as there may be multiple alternative job sets for performing the project. Jobs within a particular job set have precedence constraints and resource requirements. These resource requirements may be tied to a particular resource instance (rather than any instance of the resource class), due to the particular capabilities of that resource, or the presence of persistent state. A given job may simultaneously use multiple resources of the computer system 10.

A job set's requirement for a given resource may be fixed or variable, with respect to system resources and/or time. If variable, the resource allocation may impact how long that job takes to complete. Each resource has a finite capacity, and the resource may be allocated in discrete or continuous units.

The scheduler 110 considers penalty rates, or costs, that are associated with each considered job set. For example, for a data recovery operation, the costs that are considered by the schedule may be a cost due to downtime, a cost attributable to the impact of the loss of recently updated data and a cost attributable to the vulnerability to subsequent failures during execution of the job set. Furthermore, the scheduler 110 considers the set of capabilities (such as bandwidth, disk capacity, memory space, etc.) of each resource and the alternative recovery strategies for each workload.

For each project, the scheduler 110 evaluates each of the project's job set alternatives, in ascending order of alternative penalties, as further described below. Each evaluation produces a tentative version of the schedule for the projects evaluated so far and the resource allocations for the jobs corresponding to the tentatively chosen alternatives. The scheduler 110 uses the tentative version of the schedule to calculate the corresponding penalties while keeping track of the best alternative seen so far for the project. When all of the project's alternatives have been evaluated by the scheduler 110, the scheduler 110 selects the best alternative for performing the project. In this regard, in accordance with embodiments of the invention, for each project, the scheduler 110 selects the job set associated with the minimal additional costs, or penalties, to the total cost incurred so far and adds the job set to the schedule. The scheduler 110 further adds the penalties of the selected job set to the total penalties so far incurred for the current version of the schedule.

For scheduling each job in the alternative job set, the scheduler 110 examines the current schedule for an opening, or "hole," in the existing schedule, where the minimal resource requirements of the job may be met. The scheduler's goal is to determine whether the size of the hole is big enough to complete the job's required work. In general, a job of a particular job set starts only after its predecessors have completed. If additional capacity is available for the required resource for all or part of the hole, then the scheduler 110 increases the job's allocation up to the maximum required for the job. If multiple resources are used to accomplish the job (such as in a data recovery scheduling problem where a tape library and a disk array are required to restore a tape backup to an online storage system, for example), the scheduler 110 determines whether spare capacity exists for all of the resources and then allocates the required resource capacity simultaneously. This elastic resource allocation permits resource consumption to vary over time, depending on resource availability, which then permits a job to take advantage of additional available resources to expedite its completion.

In accordance with some embodiments of the invention, the scheduler 110 performs a technique 200 that is depicted in FIG. 3. Pursuant to the technique 200, the scheduler 110 determines (block 204) potential job sets for each project and orders (block 208) the projects in descending order according to penalty rates (e.g., start time penalty rates). For each project, the scheduler 110 orders (block 212) job sets in ascending order according to the alternative penalties. The technique 200 then schedules the job set for each project.

More specifically, the technique 200 begins an iteration to schedule the job set for each project, according to the order established in block 212. First, the scheduler 110 tentatively schedules (block 216) the jobs in the next job set and calculates (block 220) the penalties (e.g., start time penalties and/or duration penalties) for the job set. The scheduler 110 then selectively removes (block 222) the tentatively added jobs. If another job set is part of the project (diamond 224), then control returns to block 216. Otherwise, the job sets have been evaluated and the scheduler 110 selects the best job set (i.e., when scheduled, the job set adds the least additional penalties to the total penalties) and adds it to the schedule, pursuant to block 228. If more projects are to be processed (diamond 232), then the next project is selected (block 236) and control returns to block 212. Otherwise, the schedule is complete.

Figure 4:
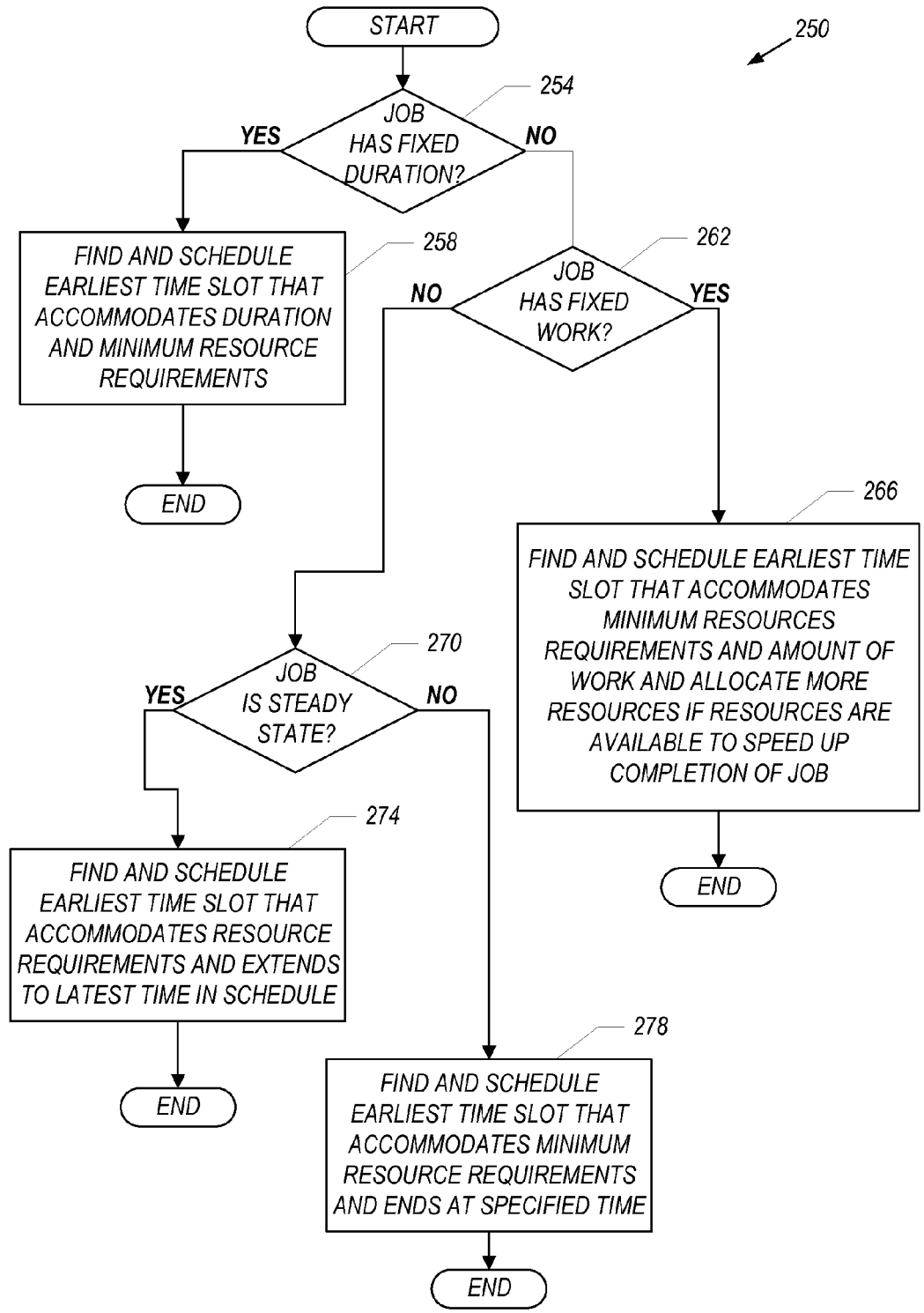
FIG. 4 is a schematic diagram of a technique to schedule a job according to an embodiment of the invention.

In accordance with some embodiments of the invention, the scheduler 110 may perform a technique 250 that is depicted in FIG. 4 for purposes of scheduling the jobs for a particular job set. For this example, the jobs may be one of four types: a fixed duration job; a fixed work job; a steady state job or a non-fixed, non-steady state job.

A fixed duration job requires a fixed amount of capability (such as bandwidth, memory space, disk space, etc.) of certain resources for a fixed amount of time. Reprovisioning a resource (e.g., reprovisioning an array after an array failure) is also a fixed duration job. However, the job does not have any additional resource requirements. A fixed work job entails a fixed amount of work to be done, such as the transfer of a fixed amount of data from one resource to another resource. However, the resource requirements are not fixed and may vary between minimum and maximum values. Such jobs can finish faster if more resources are made available to these jobs. Restoring the primary copy of the data on an array from backup tapes using a tape library or copying data from a remote mirror are examples of fixed work jobs. A steady-state job continuously requires a fixed amount of certain resources (a fixed disk bandwidth, a bus bandwidth, memory space, etc.). After a steady state job begins, the job does not release the resources that the job consumes. As an example in the context of data recovery scheduling, a job that represents the state in which an application is restored and is up and running locally is a steady state job, because once the application has been restored, it won't be stopped. A non-fixed non-steady-state job requires a fixed amount of resources, but neither the duration nor the work requirements are fixed. Such a job may start after the preceding job ends and the required resources are available, and the job continues until the succeeding job begins. In a recovery operation involving failover, the job representing the application running remotely after a failover operation (but before the workload is failed back to the local site) is an example of a non-fixed non-steady state job.

Pursuant to the technique 250, the scheduler 110 determines (diamond 254) whether a job has a fixed duration. If so, the scheduler 110 finds and schedules (block 258) the earliest time slot that accommodates the duration and the minimum resource requirements for the job. If the scheduler 110 determines (diamond 262) that the job has fixed work, then the scheduler 110 finds and schedules (block 266) the earliest time slot that accommodates the minimum resource requirements and amount of work. In accordance with some embodiments of the invention, the scheduler 110 may allocate more resources to fixed work jobs, if the resources are available to speed the completion of these jobs. If the scheduler 110 determines (diamond 270) that the job is a steady state job, then the scheduler 110 finds and schedules (block 274) the earliest time slot that accommodates the resources for the job and extends to the latest time in the schedule. If the job is neither a fixed duration job, a fixed work job nor a steady state job, then the scheduler 110 finds and schedules (block 278) the earliest time slot that accommodates the minimum resources for the job and ends at a specified time (e.g., the time when the succeeding job begins).

Referring back to FIG. 1, as a more specific and non-limiting example, in accordance with some embodiments of the invention, the multi-constrained project scheduling may arise in scheduling jobs for a data recovery operation. In this regard, the servers 102 may execute applications 104 to form corresponding workloads; and in general, each application workload may have an associated dataset, which may need to be recovered in the event of a site disaster, local array failure, etc. For example, datasets for application workloads on a given site 100 may be stored in a storage array 106 that fails. Several data recovery options may be available to recover these datasets. For example, the recovery of a particular dataset may involve failing over to a remote mirror, recovering the dataset from backup storage 108, recovering the dataset from a data vault on another site 100, etc.

The scheduling decisions involve determining what copy of data should be used to recover each dataset after the failure; how the recovery operations should be balanced with each other and with the continued execution of workloads unaffected by the failure; and how the resources should be scheduled.

Applications, in general, incur penalties for downtime, the loss of recently updated data and the vulnerability to subsequent failures during the recovery process. Therefore, the goal of the scheduling is to determine a schedule that minimizes the overall penalties, or costs, that are incurred during the process to recover all of the lost datasets.

The inputs to the data recovery scheduling problem include at least the following time-related costs to recover the dataset for a given application workload: an alternative penalty rate (dollars per hour of recent data loss), a start time penalty rate (dollars per hour of downtime until the application is restarted) and a duration penalty rate (dollars per hour where the restarted application is vulnerable to subsequent failures during the recovery process). Furthermore, the inputs to the data recovery scheduling problem also include the capabilities for the resources and the choice of alternative recovery paths that are available to recover the dataset for each workload.

The scheduling achieved using the techniques 200 and 250 may be improved by a technique that searches the solution space in a more controlled manner. For example, in accordance with some embodiments of the invention, the scheduler 110 may use the techniques 200 and 250 to produce an initial schedule and then use a more solution space-constrained technique to refine, or improve the schedule. As a non-limiting example, a metaheuristic technique that is associated with a global optimization problem may be used to improve, or refine the schedule. As can be appreciated by one of skill in the art, these techniques include genetic algorithms, simulated annealing, taboo search, etc. Although simulated annealing is described below as a specific, non-limiting example, one of skill in the art would appreciate that other solution-constrained techniques may be used in accordance with other embodiments of the invention.

Annealing is, in general, a technique for hardening metals, which involves heating up a metal to its melting point and then slowly cooling off the metal to allow the atoms of the metal to reach lower energy states. The simulated annealing algorithm involves exploring a solution space in a random manner to find an acceptable solution in a reasonable amount of time, instead of searching of the entire solution space for an optimal solution. The simulated annealing technique involves using a "synthetic temperature," which is initially large but decreases as the simulated annealing progresses. In general, relatively poor solutions are accepted (and a large solution space is therefore explored) initially when the synthetic temperature is large. However, as the synthetic temperature decreases, fewer bad solutions are accepted as the algorithm settles on a minimum. Due to the large initial synthetic temperature, solutions are initially precluded from settling into local minima.

The simulated annealing technique explores the space and may accept a newly evaluated solution. In general, a solution is accepted if the solution reduces the evaluated cost. However, the solution may also be accepted if the solution increases the cost based on evaluating a probability of accepting a worse solution. When the synthetic temperature is large, the probability of accepting a worse solution is relatively high, thereby allowing higher cost solutions. As the synthetic temperature decreases, fewer higher cost solutions are accepted.

In accordance with some embodiments of the invention, the scheduler 110 performs the simulated annealing in stages. In the initial stage, the scheduler 110 randomly orders all of the projects. However, as the simulated annealing progresses in subsequent stages, more projects are fixed in order.

Figure 5:
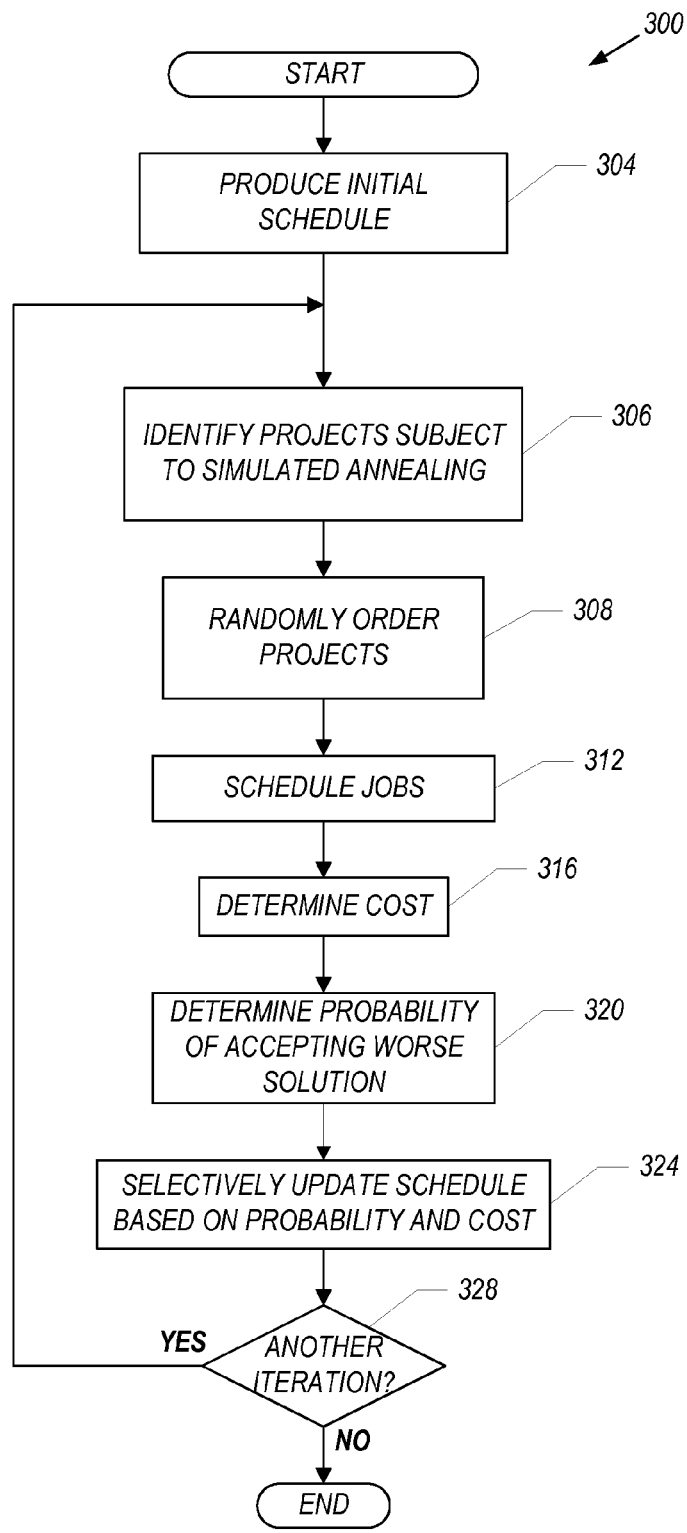

As a more specific example, FIG. 5 depicts a simulated annealing-based technique 300 that may be used by the scheduler 110 in accordance with embodiments of the invention. Pursuant to the technique 300, the scheduler 110 produces (block 304) an initial schedule using a "greedy" scheduling technique, such as the techniques 200 and 250. Using this initial solution, the scheduler 110 applies simulated annealing. In this regard, in the initial stage, all of the projects may be subject to the simulated annealing technique and the number of projects that are subject to the simulated annealing may decrease in subsequent stages, as described above. After the identification of the projects that are subject to the simulated annealing (block 306), the technique 300 includes randomly ordering the identified projects, pursuant to block 308 and scheduling the jobs 312, as set forth above. After the jobs are scheduled, the scheduler 110 determines the cost of accepting this solution, pursuant to block 316 and determines (block 320) the probability of accepting a worse solution. Based on the probability and cost, the scheduler 110 selectively retains the current solution as the best solution seen so far, pursuant to block 324. If another iteration (diamond 328) is to occur, then the projects subject to the simulated annealing are again identified (block 306) and another simulated annealing-based iteration occurs. Ultimately, the simulated annealing process ends with the saved best solution as the output.

Figure 6:
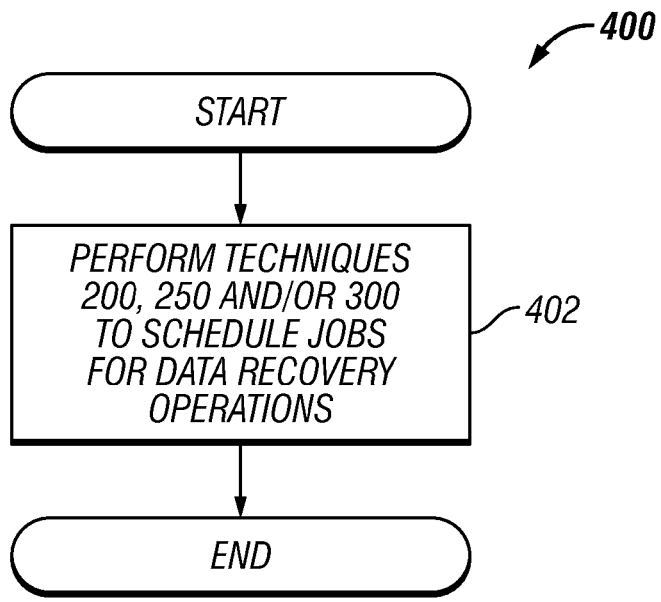
FIG. 6 is a flow chart depicting a technique to schedule jobs for data recovery operations according to an embodiment of the invention.
Figure 7:
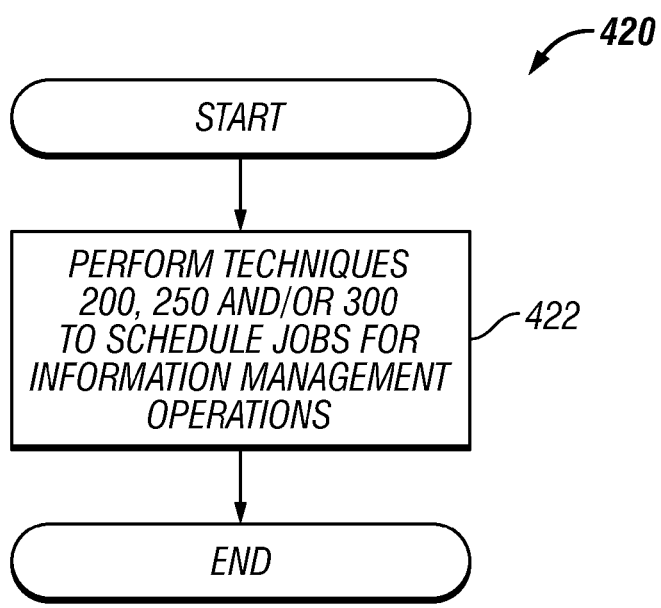
FIG. 7 is a flow chart depicting a technique to schedule jobs for information management applications.

In view of the foregoing, one of skill in the art would appreciate that various embodiments are within the scope of the appended claims. For example, referring to FIG. 6, in accordance with some embodiments of the invention, a technique 400 includes performing (block 402) the techniques 200, 250 and/or 300 to schedule jobs for data recovery operations. In other embodiments, a technique 420 that is depicted in FIG. 7 includes performing (block 422) the techniques 200, 250 and/or 300 to schedule jobs for information management applications. Other applications (scheduling computations for cloud computing, for example) of the multi-alternative constraint project scheduling techniques and systems that are disclosed herein are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    determining in a computer an order for projects to be performed on a computer system, each project being associated with multiple job sets such that any of the job sets may be executed on the computer system to perform the project; and
    selecting the projects in a sequence according to the determined order to progressively build a schedule of jobs for execution on the computer system, comprising:
        for each selected project, tentatively incorporating each of the associated job sets into the schedule and determining a cost associated with the tentative incorporation of the job set into the schedule; and
        for each selected project, selecting one of the associated job sets based at least in part on the costs associated with the tentative incorporation of the job sets,
    wherein each of the job sets comprises a plurality of jobs, and incorporating each of the associated job sets into the schedule comprises for each job of the associated job set, locating a time interval in the schedule in which resources of the computer system are available to begin and complete the job in the time interval.

2. The method of claim 1, further comprising:
    allocating the resources to accommodate the job.

3. The method of claim 1, wherein the cost comprises a cost that includes one or more of the following cost components: a start time cost, an alternative cost, and a duration cost.

4. The method of claim 1, wherein determining the order comprises determining the order based on start time costs of the projects.

5. The method of claim 1, wherein determining the order comprises performing a metaheuristic technique.

6. The method of claim 5, wherein the metaheuristic technique comprises a simulated annealing technique.

7. The method of claim 1, wherein the projects comprise data recovery operations, system management operations or cloud computing operations.

8. An apparatus comprising:
    a computer; and
    a computer-based scheduler executed by the computer to:
        identify projects to be executed on a computer system pursuant to a schedule to perform an operation on the computer system;
        determine a sequence in which the projects are processed by the scheduler to generate the schedule; and
        process the projects according to the sequence to generate the schedule, the processing including:
            for each selected project, tentatively incorporating each of the associated job sets into the schedule and determining a cost associated with the tentative incorporation of the job set into the schedule; and
            for each selected project, selecting one of the associated job sets based at least in part on the costs associated with the tentative incorporation of the job sets, wherein each of the job sets comprises a plurality of jobs, and the scheduler is adapted to for each job of the associated job set, locate a time interval in the schedule in which resources of the computer system are available to begin and complete the job in the time interval.

9. The apparatus of claim 8, wherein the scheduler is adapted to order the projects based on one of a metaheuristic technique and start time costs associated with the projects.

10. The apparatus of claim 9, wherein the metaheuristic technique comprises a simulated annealing technique.

11. The apparatus of claim 8, wherein the projects comprise data recovery operations, system management operations or cloud computing operations.

12. Instructions stored on a non-transitory computer readable storage medium that when executed by a computer cause the computer to:

determine an order for projects to be scheduled on a computer system, each project being associated with multiple job sets such that any of the job sets may be executed by the computer to perform the project; and select the projects in a sequence according to the determined order to progressively build a schedule of jobs for execution on a computer system, including:

for each selected project, tentatively incorporating each of the associated job sets into the schedule and determining a cost associated with the tentative incorporation of the job set into the schedule; and for each selected project, selecting one of the associated job sets based at least in part on the costs associated with the incorporation of the job sets, wherein each of the job sets comprises a plurality of jobs, and the storage medium storing instructions that when executed cause the computer to for each job of the associated job set, locate a time interval in the schedule in which resources of the computer system are available to begin and complete the job in the time interval.

13. The instructions of claim 12, the storage medium storing instructions that when executed cause the computer to order the projects based on one of a metaheuristic technique and start time costs associated with the projects.

* * * * *